(12) United States Patent
Farrell et al.

(10) Patent No.: US 9,065,689 B2
(45) Date of Patent: Jun. 23, 2015

(54) APPARATUS AND METHOD FOR RECEIVING SIGNALS IN A VEHICLE

(75) Inventors: Brian Farrell, Troy, MI (US); Matthew D. McIntyre, New Baltimore, MI (US); Yasser Gad, Macomb, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 13/335,350

(22) Filed: Dec. 22, 2011

(65) Prior Publication Data
US 2013/0166102 A1 Jun. 27, 2013

(51) Int. Cl.
*G05D 1/00* (2006.01)
*H04L 27/00* (2006.01)
*B60C 23/04* (2006.01)

(52) U.S. Cl.
CPC ........ *H04L 27/0008* (2013.01); *B60C 23/0418* (2013.01); *B60C 23/0435* (2013.01); *B60C 23/0462* (2013.01)

(58) Field of Classification Search
USPC .......................................................... 701/2
See application file for complete search history.

(56) References Cited

U.S. PATENT DOCUMENTS

| | | | |
|---|---|---|---|
| 2003/0122660 A1* | 7/2003 | Kachouh et al. | 340/442 |
| 2005/0104715 A1 | 5/2005 | Farrell | |
| 2006/0114921 A1* | 6/2006 | Nakajima | 370/412 |
| 2007/0090919 A1* | 4/2007 | Desai et al. | 340/5.61 |
| 2008/0177441 A1 | 7/2008 | Marlett et al. | |
| 2010/0215135 A1* | 8/2010 | Okada | 375/362 |

FOREIGN PATENT DOCUMENTS

| | | |
|---|---|---|
| EP | 1187346 A2 | 3/2002 |
| EP | 1187346 A3 | 5/2003 |
| EP | 1480339 A1 | 11/2004 |
| EP | 1480399 A2 | 11/2004 |
| EP | 1589714 A1 | 10/2005 |
| JP | 2006205838 A | 8/2006 |
| RU | 2006124600 A | 2/2008 |
| WO | 02/066269 A2 | 8/2002 |
| WO | 02/066269 A3 | 8/2002 |
| WO | 02/093857 A1 | 11/2002 |
| WO | 2007/087471 A2 | 8/2007 |
| WO | 2007/087471 A3 | 8/2007 |

OTHER PUBLICATIONS

Search Report dated Aug. 23, 2012, from corresponding GB Patent Application No. 1205794.9.
International Search Report and Written Opinion dated Apr. 11, 2013, from corresponding International Patent Application No. PCT/US2012/070919.

* cited by examiner

*Primary Examiner* — Hussein A. Elchanti

(57) ABSTRACT

At a vehicle, a first signal is received and the first signal is of an ASK-compliant modulation type. A second signal is received and the second signal is of a FSK-compliant modulation type. Based upon a set of predetermined criteria, one of the first signal and the second signal is selected, the predetermined criteria at least in part indicating a priority as between ASK-compliant and FSK-compliant communications. The selected signal is transmitted to a vehicular controller over a single transmission line.

23 Claims, 9 Drawing Sheets

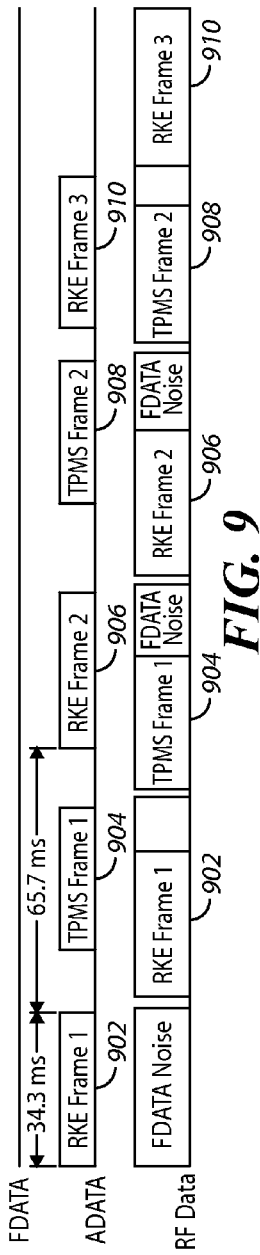
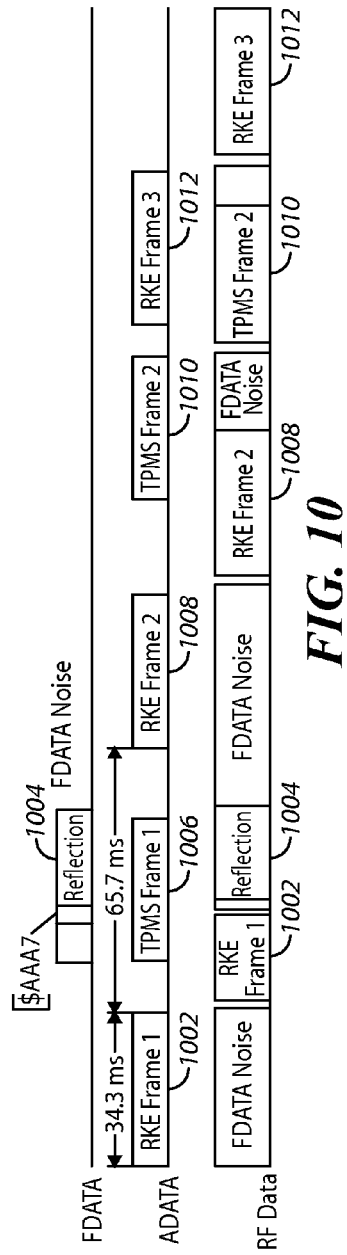
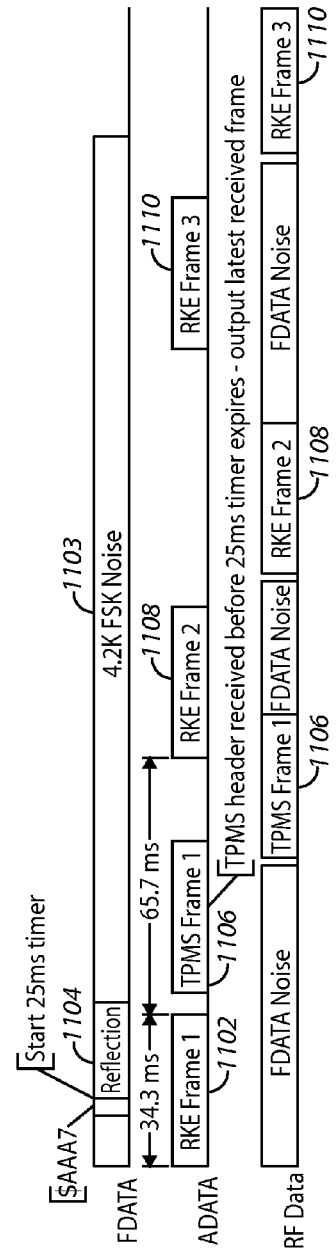
FIG. 9
FIG. 10
FIG. 11

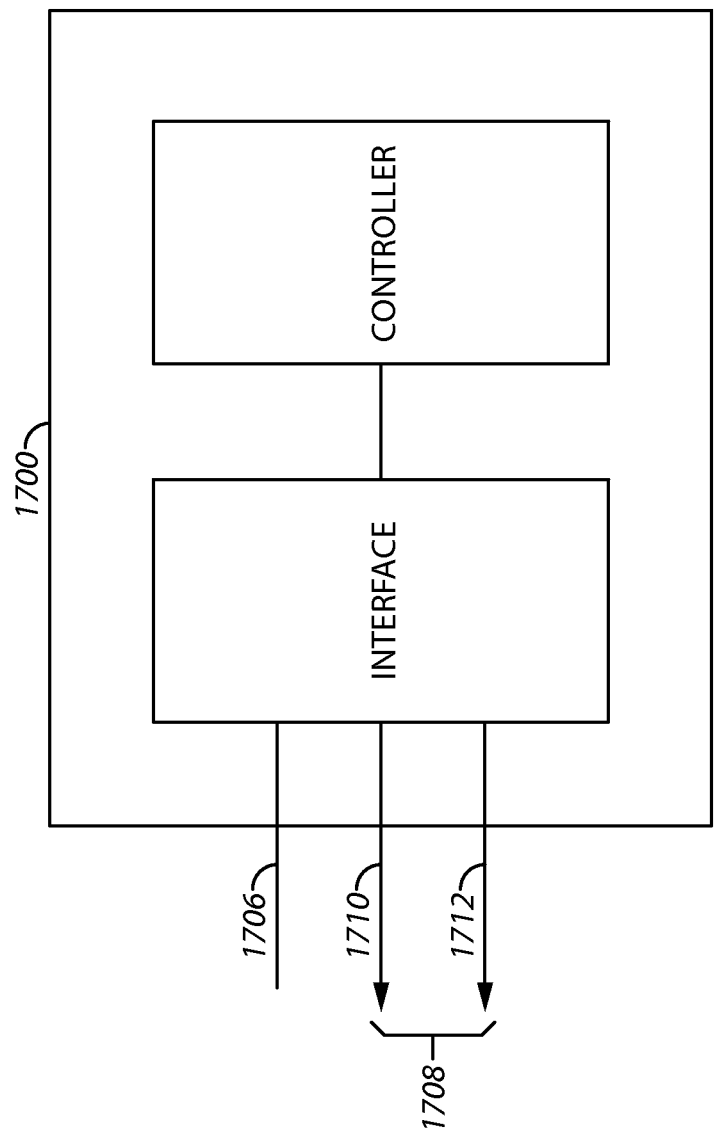

APPARATUS AND METHOD FOR RECEIVING SIGNALS IN A VEHICLE

TECHNICAL FIELD

This patent relates to receivers and, in one aspect, receivers in vehicles that receive multiple types of signals.

BACKGROUND OF THE INVENTION

Radio frequency (RF) receiver modules are often used in vehicles. These modules are placed in vehicles and receive various types of RF signals from various sources such as passive entry passive start (PEPS) systems, remote keyless entry (RKE) systems, and tire pressure sensors. The RF receiver module is typically connected to a vehicular controller in the vehicle and this control module controls/supplies information to other devices in the vehicle (e.g., displays, other processing modules, and so forth).

A single physical wire is typically used to couple previous RF receiver modules to the vehicular controller. The single wire is used for sake of simplicity and cost. Use of the single wire is not a concern when only one type of data is received. However, receivers in today's vehicles must receive multiple types of data (e.g., both amplitude shift keying (ASK) modulated data and frequency shift keying (FSK) modulated data). Multiple protocols (e.g., PEPS, RKE, and Tire Pressure Monitoring System (TPMS) protocols) are also used and information can be transmitted according to these protocols using the various modulation approaches (e.g., PEPS frames can be transmitted using FSK modulation).

One previous approach that attempted to deal with multiple signal types was to use a separate receiver for each type of possible signal type. Unfortunately, this attempted solution had several disadvantages. More specifically, it was costly to implement since it required separate chips/hardware and produced an output of two or more physical wires, not the one wire required by most vehicular control modules. Consequently, these previous approaches failed to adequately deal with multiple modulation types/protocol types and user dissatisfaction with these previous approaches has resulted.

BRIEF DESCRIPTION OF THE DRAWINGS

For a more complete understanding of the disclosure, reference should be made to the following detailed description and accompanying drawings wherein:

FIG. 9 comprises a timing diagram of one example of an interleaved RKE burst and a TPMS burst according to various embodiments of the present invention;

FIG. 10 comprises a timing diagram of one example of an ASK frame being received with a flag according to various embodiments of the present invention;

FIG. 11 comprises a timing diagram of another example of an ASK frame being received with a flag according to various embodiments of the present invention;

FIG. 17 shows a block diagram of a control unit in a receiver module according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided where received data is analyzed and different data types are separated (e.g., FSK data is separated from ASK data). A determination is made as to whether to select a particular data type (e.g., the FSK data or the ASK data) for outputting over a single transmission line. The single transmission line is coupled to a vehicular controller or control unit. For example, the vehicular control unit may be used to lock or unlock the doors and report tire pressure status.

In many of these embodiments, at a vehicle, a first signal is received and the first signal is of an ASK-compliant modulation type. A second signal is also received and the second signal is of a FSK-compliant modulation type. Based upon a set of predetermined criteria, one of the first signal and the second signal is selected. The predetermined criteria at least in part indicates a priority as between ASK-compliant and FSK-compliant communications. The selected signal is transmitted to a vehicular controller over a single transmission line.

In some aspects and situations, the selection determines whether the first signal or the second signal is a reflected signal (i.e., a signal present on one input line that originates from or is reflected from another transmission line, e.g., a ASK signal present on an ASK data input line that reflects onto the FSK input line) and then, disregard the reflected signal. In other aspects, the first signal may be remote keyless entry (RKE) frame or a tire pressure monitoring system (TPMS) frame. In other aspects, the second signal is a PEPS frame. Other examples of signal and modulation types are possible.

In some aspects and situations, low priority frames are recreated. In still other aspects and situations, high priority frames are recreated. The recreated frames are output to a vehicular controller over the single transmission line. Frames may need to be recreated because the entire frame may need to be received before the receiver module is sure that it is the low priority frame type (e.g., an ASK frame) rather than a reflection of the high priority frame type (e.g., a FSK frame). On the other hand, a high priority frame type (e.g., a FSK frame) may need to be recreated if a low priority frame type is being recreated when the high priority frame type is detected.

Figure 1:
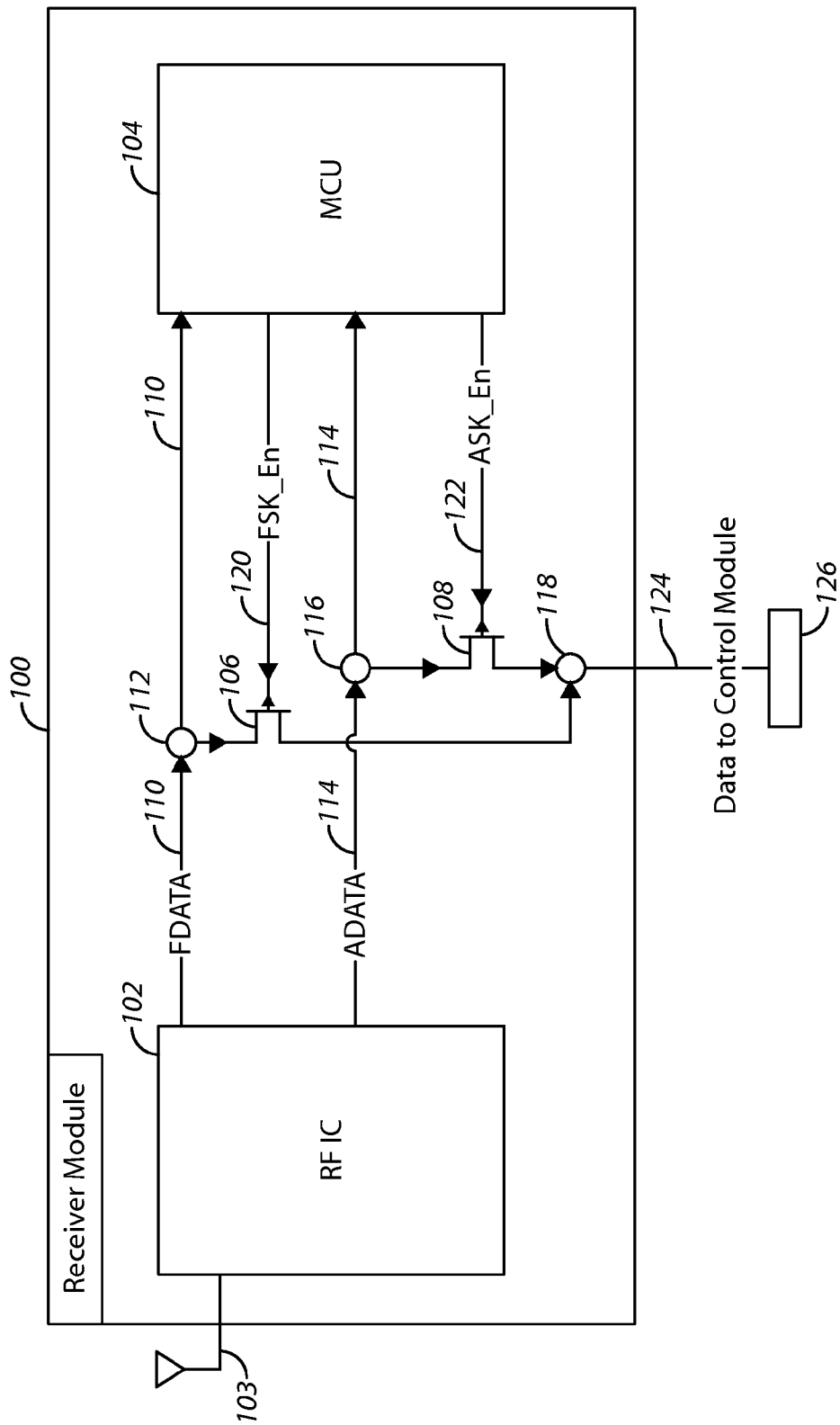
FIG. 1 comprises a block diagram of a receiver module according to various embodiments of the present invention.

Referring now to FIG. 1, one example of a receiver module 100 is described. In the examples described herein, the module 100 is disposed within or at a vehicle (e.g., a car, truck, train, ship, and so forth). However, it will be appreciated that the module 100 and the other modules described herein may be disposed at other locations as well.

The module 100 comprises an RF integrated circuit 102, a control unit 104, a first transistor or switch 106, and a second transistor or switch 108. A FSK data line 110 transmits FSK data to a node 112 and from the node 112 to the control unit 104 and the first transistor 106. As used herein, a "node" is an electrical connection point with no additional circuitry or function. An ASK data line 114 transmits ASK data to a node 116 and from the node 116 to the control unit 104 and to the second transistor 108. The output of the first transistor 106 and the second transistor 108 are transmitted to a node 118. A FSK enable line 120 activates and deactivates the transistor 106. An ASK enable line 122 enables and disables the transistor 108. Data from the node 118 is output over a single data line 124 to a control module 126. In the examples described herein, ASK modulation and FSK modulation are the two data modulation types used. However, it will be appreciated that other modulation types are possible. Additionally, selection as between these types for outputting may be made based upon criteria that are different from the modulation type.

The RF integrated circuit 102 is any circuit that is configured to receive and separate ASK modulated data from FSK modulated data and output this information over lines 110 and 114. Wireless data arrives on an antenna 103. The data may arrive separately or together. In one example, the RF integrated circuit is a ASK/FSK Superheterodyne Receiver chip manufactured by Maxim corporation. Other examples are possible.

The control unit 104 determines when to activate the lines 120 and 122. In one aspect, by default higher priority modulation data (e.g., FDATA) is given priority for outputting over line 124. For instance, a protocol that cannot withstand delays is given priority. In one example, PEPS data may be transmitted in FSK and this cannot withstand substantial delays. Consequently, this data may be given priority. RKE data and TPMS data are transmitted in ASK.

The lines 120 and 122 selectively activate the transistors 106 and 108. When the transistor 106 is activated, FDATA is selected. When the transistor 108 is activated, ADATA is selected. The selected data is output over a single transmission line 124 to the vehicular controller 126. The vehicular controller 126 may perform functions such as locking or unlocking the doors, and reporting tire pressure status. Other examples are possible. The transistors 106 and 108 are not activated at the same time.

Figure 2:
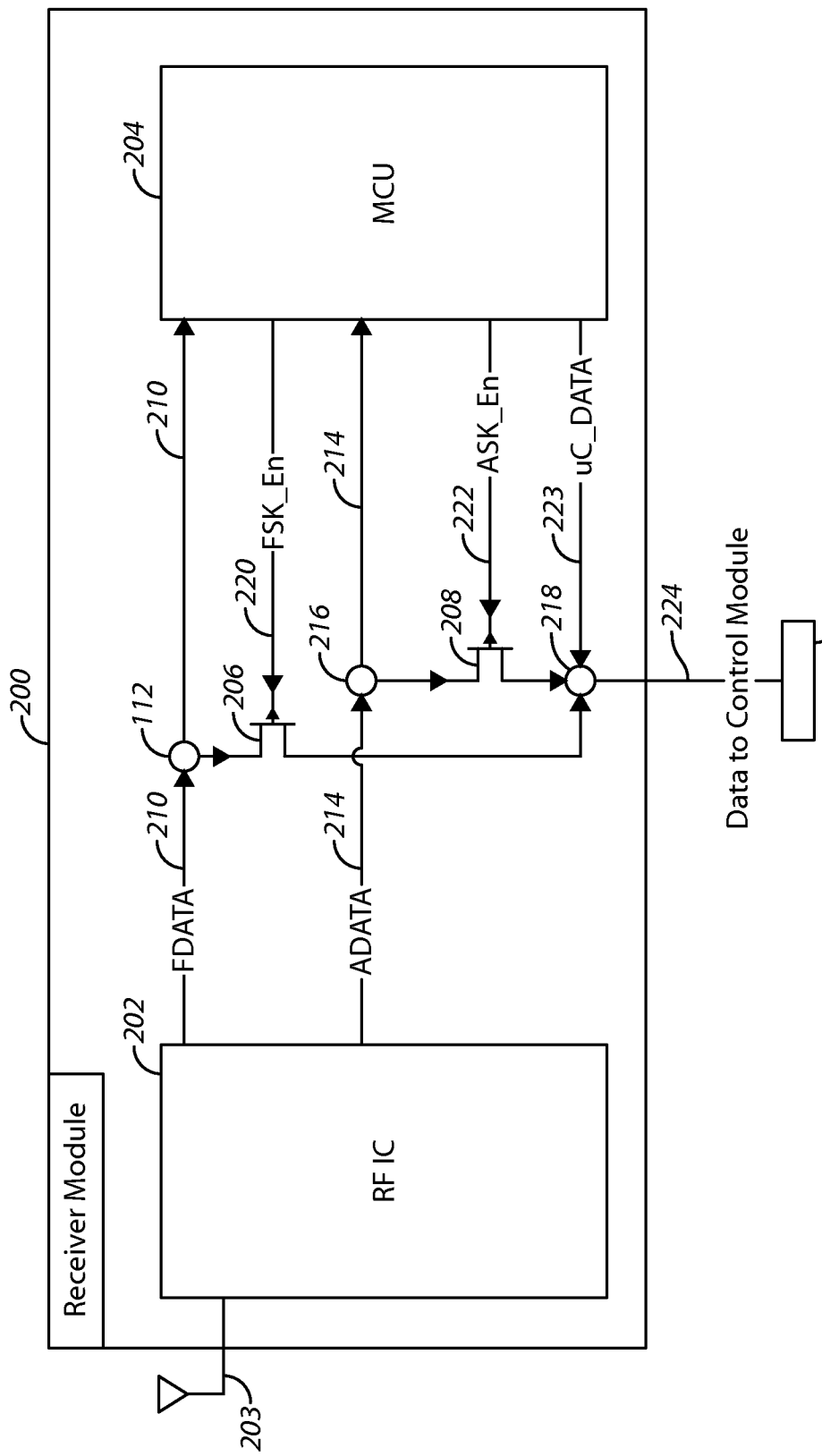
FIG. 2 comprises a block diagram of a receiver module according to various embodiments of the present invention.

Referring now to FIG. 2, one example of a receiver module 200 is described. The module 200 comprises an RF integrated circuit 202, a control unit 204, a first transistor or switch 206, and a second transistor or switch 208. A FSK data line 210 transmits FSK data to a node 212 and from the node 212 to the control unit 204 and the first transistor 206. An ASK data line 214 transmits ASK data to a node 216 and from the node 216 to the control unit 204 and to the second transistor 208. The output of the first transistor 206 and the second transistor 208 are transmitted to a node 218. A FSK enable line 220 activates and deactivates the transistor 206. An ASK enable line 222 enables and disables the transistor 208. Microcontroller (uC) data 223 is transmitted from the controller 204 to the node 218. Data from the node 218 is output over a single data line 224 to a control module 226.

The RF integrated circuit 202 is any circuit that is configured to receive and separate ASK modulated data from FSK modulated data and output this information over lines 210 and 214. This data arrives on an antenna 203. The data may arrive separately or together. In one example, the RF integrated circuit is a ASK/FSK Superheterodyne Receiver chip manufactured by Maxim corporation. Other examples are possible.

The control unit 204 determines when to activate the lines 220 and 222. In one aspect, by default, higher priority modulation data (e.g., FDATA) is given priority. For instance, a protocol that cannot withstand delays is given priority. In one example, PEPS data may be transmitted in FSK and this cannot withstand substantial delays. Consequently, this may be given priority for outputting over the line 224. RKE data and TPMS data are transmitted in ASK. The lines 220 and 222 selectively activate the transistors 206 and 208.

When the transistor 206 is activated, FDATA is selected. When the transistor 208 is activated, ADATA is selected. The selected data is output over a single transmission line 224 to the vehicular controller 226. The vehicular controller 224 may perform functions such as locking or unlocking the doors and reporting tire pressure status. Other examples are possible. The transistors 206 and 208 are not activated at the same time. In another aspect, both are deactivated so that data recreated by the controller 204 can be output over the data line 224.

In other aspects, RF protocols contain a preamble at the beginning of the data frame which could be used to detect incoming valid RF data and then pass the rest of the RF data to the control unit 204 for processing. In this case, a microcontroller at the control unit 204, monitors the ASK and FSK data output from the receiver chip 202 over lines 210 and 214 and, after detecting the beginning of a RF data frame, connecting the appropriate data line, line 214 (transmitting ASK data) or line 210 (transmitting FSK data), to the vehicular controller 226. However, while the receiver chip 202 is configured to receive both ASK and FSK data, potentially received FSK data may appear on both the ASK and FSK data outputs 210 and 214 and/or received ASK data may appear on both the ASK and FSK data outputs 210 or 214. For example, if the control unit 204 gives FSK priority and a received ASK signal also appears on the FSK data output 210 in such a way that it passes the inspection of the beginning of the frame then the FSK output 210 will be connected to the vehicular controller 226. However, in this case the beginning of the frame may be output well enough, but there may be noise in the rest of the frame so that the control unit 204 is unable to process the frame. So, at that point the frame is lost.

By receiving the entire low priority frame (e.g., a RKE frame) before recreating it the receiver module is sure that it is an actual low priority frame type (e.g., a ASK frame) rather than a reflection of the high priority frame type (e.g., a FSK frame). One advantage of recreating the frame after it has been received is that reflection occurs while the frame is being received. By recreating the frame after it has been received there will not be any reflection of the low priority signal (e.g., a RKE frame) on the high priority output (e.g., the FDATA line) causing the loss of the low priority signal when a true high priority signal is not actually present.

In this example, FDATA will be connected to the vehicular controller 226 unless an entire ASK frame (e.g., RKE and TPMS) is received on the ADATA line 214. The ASK frame will not be recreated on the RF data line 224 to the vehicular controller 226 via the line 223 until the entire frame is received. In this manner, typically there will not be any ASK data being received at the time of recreation and therefore will not be any reflection on the FSK line 210 that could cause a halting of the transmission of the ASK frame to the vehicular controller 226.

Before an ASK frame is recreated to the vehicular controller 226 on the RF DATA line 224, FDATA is disconnected from RF DATA line 224. Therefore, the controller 204 determines that a FSK frame (e.g., a PEPS frame) is not currently being received. This is determined by checking if $AAA7 (a PEPS preamble/header) has been received on the FDATA line during the previous 25 ms. If valid data is present on FDATA and the 25 ms timer is active then the ASK Frame will not be recreated on the RF DATA line until the 25 ms timer expires.

While an ASK frame is being recreated on the RF DATA line 224, the ADATA line 214 and FDATA line 210 will be monitored by the control unit 204. Another ASK frame can be received while recreating an ASK frame. ASK frames are recreated at a faster data rate than they are received. This allows recreation of frames without using multiple buffers. Buffering of FSK frames is not necessary since the recreation of an FSK frame will finish before the end of the header of a subsequent FSK frame.

If an $AAA7 (or other marker) is detected on the FDATA line while recreating an ASK frame then the ASK frame recreation will be stopped and the PEPS frame recreation will start. The PEPS frame will be recreated with a small delay in this situation since the preamble and header have already been received. However, the data will be recreated to the vehicular controller 226 faster than it is received so that the delay will be minimized The possibility of reflection issues are greatly minimized in these approaches since the ASK frame is recreated after the frame is received and the reflection must contain the bit pattern $AAA7 (rather than just several bits of the preamble). The only possibility of this occurring would be an ASK frame with $AAA7 in the frame (and this is very rare) being received while recreating an ASK frame (which is not typical). There is no possibility of not receiving valid FSK data that is present on FDATA line 210.

The only time valid ASK data that is present on ADATA line 214 will not be considered is while recreating an FSK frame (e.g., a PEPS frame). However, since the recreation of FSK frames occurs while the FSK frame is being received, it is not possible to have valid ASK data on the ADATA line at this time.

Referring now to FIGS. 3-15 various timing and waveform diagrams are described that illustrate operation of the receiver modules described herein. It will be appreciated that the examples described in these figures utilize specific message types, prototypes, headers, data, and other parameters. However, it will be appreciated that these parameters are examples only and can be changed to suit the needs or requirements of specific systems and users. In these examples, a receiver chip supplies ASK data over a line ADATA and FSK data over a line FDATA to a controller that selects as between these inputs via a line RF data. The controller may also recreate data for transmitting over RF data. It will also be appreciated that the timing diagrams in these figures correspond to the workings of the circuits of FIG. 1 and/or FIG. 2. It will be further appreciated that these approaches, in one aspect, may be implemented as computer instructions stored in memory and executed by a general purpose processing device.

Figure 3:
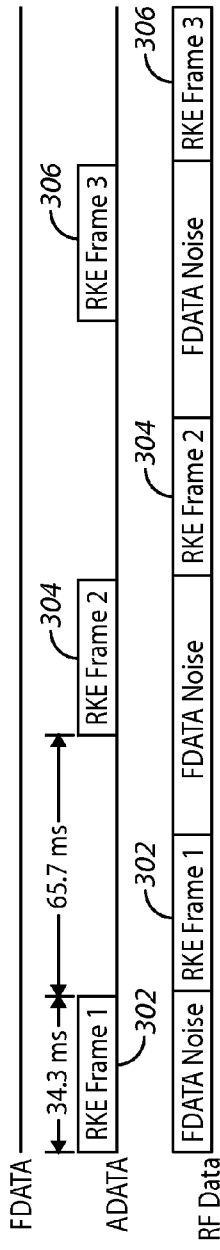
FIG. 3 comprises a timing diagram of one example of a receiver module handling a burst (e.g., an RKE burst) according to various embodiments of the present invention.

Referring now to FIG. 3, one example of how the receiver module handles a burst (e.g., an RKE burst) is described. On the ASK data line, a first RKE data frame 302 arrives (e.g., approximately 34.3 ms long) followed by a period where nothing is received (e.g., approximately 65.7 long), followed by a second RKE frame 304, followed by a no-activity period, followed by a third RKE frame 306. No data is received over FDATA. It can be seen that the RKE data frames are selected and output to the vehicle control module.

Figure 4:
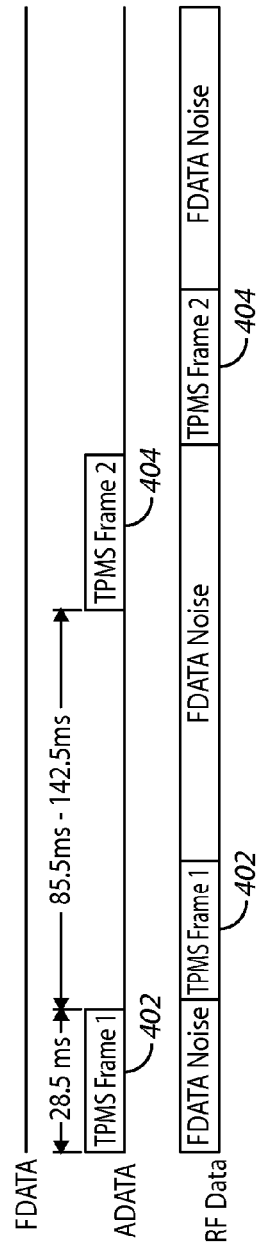
FIG. 4 comprises a timing diagram of one example a receiver module handling a tire pressure monitoring system (TPMS) burst according to various embodiments of the present invention.

Referring now to FIG. 4, one example of how the receiver module handles a tire pressure monitoring system (TPMS) burst is described. A first TPMS frame 402 (e.g., approximately 28.5 ms in duration) is received on ADATA, followed by a no activity period (e.g., approximately 85.5 ms to 142.5 ms), followed by a second TPMS frame 404. It can be seen that the TPMS frames 402 and 404 are selected and output to the vehicle control module over RF data. It will be appreciated that in this example six TPMS frames are used and that only two are shown.

Figure 5:
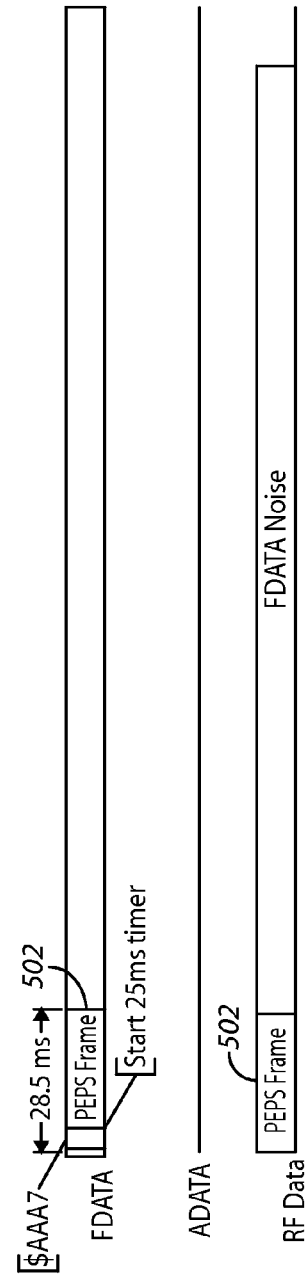
FIG. 5 comprises a timing diagram of one example of a receiver module handling a high priority frame (e.g., a PEPS frame) according to various embodiments of the present invention.

Referring now to FIG. 5, one example of how the receiver module handles a high priority frame (e.g., a PEPS frame) is described. A PEPS frame 502 (e.g., 28.5 ms in duration) with a header $AAA7 is received on FDATA. Nothing is received on ADATA. The PEPS frame 502 is passed out to RF Data with a minimum delay. A 25 ms timer is started when the PEPS frame arrives. The purpose of the timer is to ensure that a low priority frame (e.g., a RKE frame) isn't recreated while a PEPS frame is being received.

Figure 6:
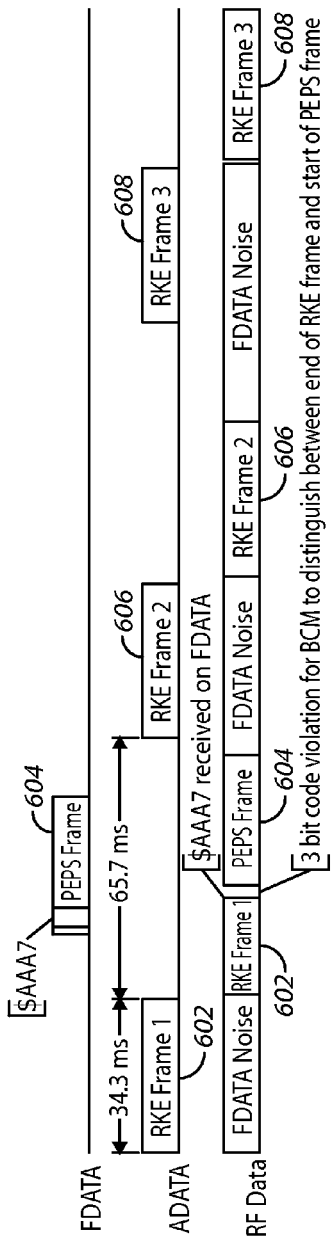
FIG. 6 comprises a timing diagram of one example a receiver handling a PEPS frame received while outputting a RKE frame according to various embodiments of the present invention.

Referring now to FIG. 6, one example of how a receiver module handles a PEPS frame received while outputting a RKE frame is described. An RKE frame 602 is received and output. A PEPS frame 604 is then received. Outputting the RKE frame 602 is halted and the PPES frame 604 received on FDATA is output with minimum delay. A RKE frame 606 is received and output. Then, a third RKE frame 608 is received and output to the vehicular controller.

Figure 7:
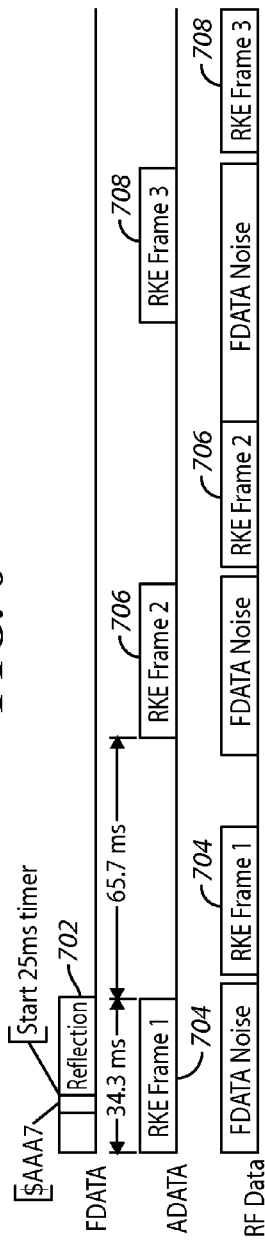
FIG. 7 comprises a timing diagram of one example of an ASK frame being received with a flag or marker according to various embodiments of the present invention.

Referring now to FIG. 7, one example of an ASK frame received with a flag or marker (e.g., $AAA7) in a frame reflected to the FDATA line is described. A reflection 702 is received on FDATA. The reflection 702 is a reflection of a RKE frame 704 received on ADATA. The ASK frame is output on the RF data line because the data on FDATA is invalid (or a timer, e.g., a 25 ms timer expires). Validity of the frame is determined by, for example, reception of correct preamble and header byte and correct number of Manchester encoded data bits at 4.2 kbps (kilobits per second). Second and third RKE frames 706 and 708 are received and output to the vehicular controller.

Figure 8:
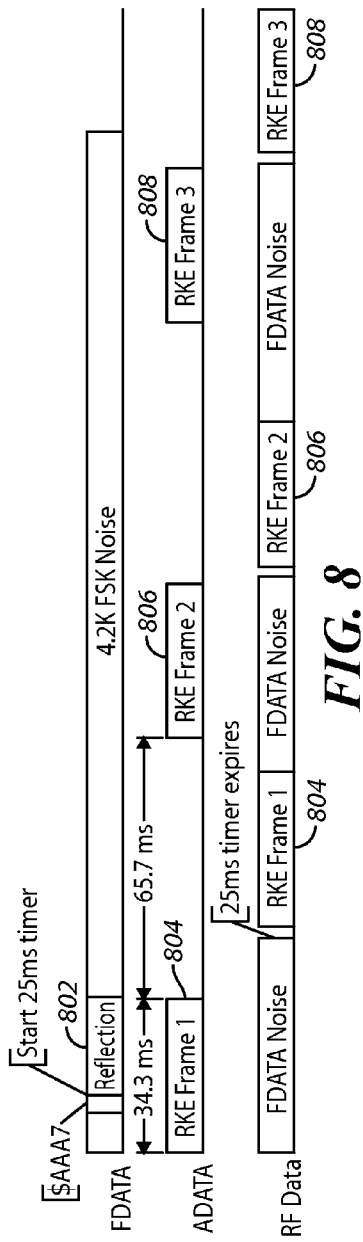
FIG. 8 comprises a timing diagram of another example of an ASK frame received with a flag or marker according to various embodiments of the present invention.

Referring now to FIG. 8, one example of an ASK frame being received with a flag or marker (e.g., $AAA7) in a frame reflected to FDATA and a FSK noise source is described. A reflection 802 is received on FDATA. The reflection 802 is a reflection of a RKE frame 804 received on ADATA. Noise 805 is received on FDATA after the frame 802. The ASK frame is output on the RF data line because the data on FDATA is invalid (or a timer, e.g., a 25 ms timer expires). Validity of the frame is determined by, for example, reception of correct preamble and header byte and correct number of Manchester encoded data bits at 4.2 kbps (kilobits per second). Second and third RKE frames 806 and 808 are received and output to the vehicular controller.

Referring now to FIG. 9, one example of an interleaved RKE burst and a TPMS burst being received is described. A first RKE burst 902 is received, followed by a first TPMS burst 904, a second RKE burst 906, a second TPMS burst 908, and a third RKE burst 910. These are output on the line RF data to the vehicular controller.

Referring now to FIG. 10, one example of an ASK frame being received with a flag (e.g., $AAA&) reflected to FDATA while transmitting an ASK frame on RF the RF data line is described. An RKE frame 1002 is received and transmitted on the RF data line. This is reflected as FDATA frame 1004. The transmission of the ASK frame is halted and the data on FDATA is transmitted over the RF data line. A first TPMS data frame 1006 is received, but this is ignored because it was received with a flag or marker (e.g., $AAA7) reflected to FDATA. A second RKE frame 1008 is received and this is output on RF data. A second TPMS frame 1010 is received and this is output on RF data. A third RKE frame 1012 is received and this is output on RF data to the vehicular controller.

Referring now to FIG. 11, one example of an ASK frame being received with a flag (e.g., $AAA&) reflected to FDATA while transmitting an ASK frame on RF the RF data line and a 4.2 k noise source is described. A first RKE frame 1102 is received. This is reflected as FDATA frame 1104 followed by noise 1103. A 25 ms timer is started. A TPMS frame 1106 is received before the 25 ms timer expires. The most recently received ASK frame is output on RF data when invalid data is detected or before the 25 ms timer expires. Validity of the frame is determined by, for example, reception of correct preamble and header byte and correct number of Manchester encoded data bits at 4.2 kbps (kilobits per second). In this case, the TPMS frame 1106 is received before the timer expires and is output on RF data. A second RKE frame 1108 is received and output. Then, a third RKE frame 1110 is received and output on RF data to the vehicular controller.

Figure 12:
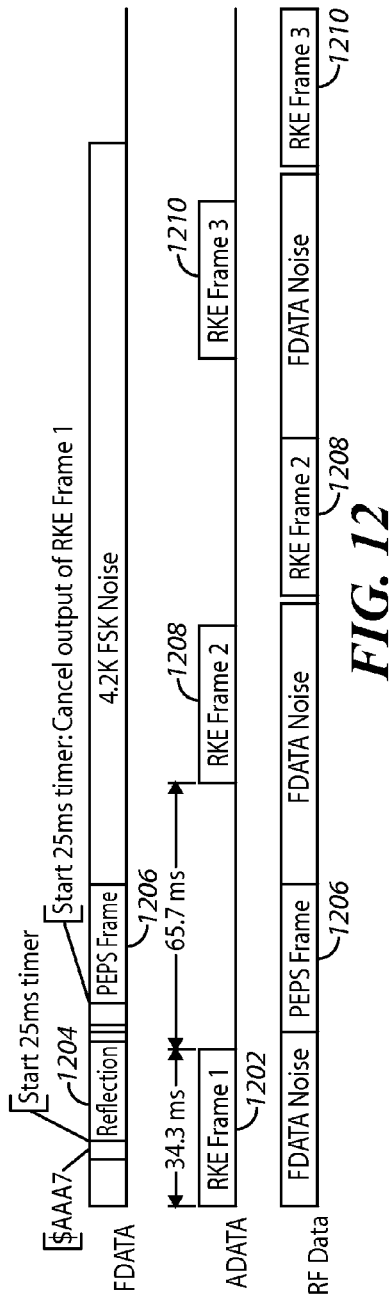
FIG. 12 comprises a timing diagram of still another example of an ASK frame being received with a flag according to various embodiments of the present invention.

Referring now to FIG. 12, one example of an ASK frame being received with a flag ($AAA7) reflected to FDATA and PEPS frame after RKE frame and a 4.2 K FSK noise source is described. An RKE frame 1202 is received and reflected as a frame 1204 on FDATA. A 25 ms timer is started. A PEPS frame 1206 is received on FDATA and the 25 ms timer is restarted. The outputting of the RKE frame is cancelled if the PEPS frame 1206 is received while the RKE output is pending. A second RKE frame 1208 is received and output on RF data. Then, a third RKE frame 1210 is received and output on RF data to the vehicular controller. The purpose of the timer is to ensure that a low priority frame (e.g., a RKE frame) is not recreated while a PEPS frame is being received.

Figure 13:
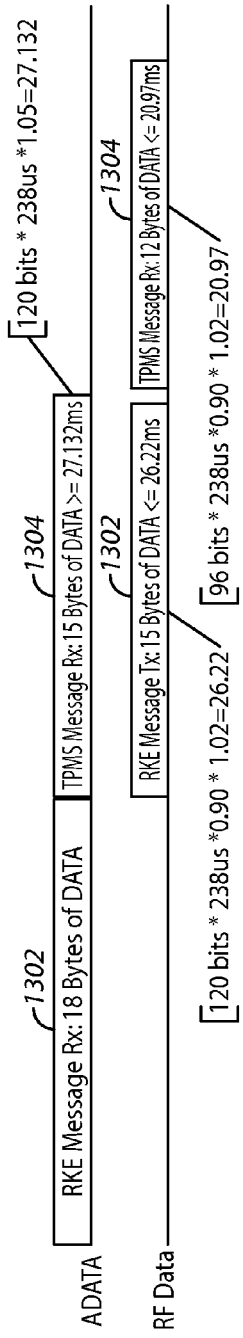
FIG. 13 comprises a timing diagram of one example of an RKE frame being received immediately followed by a TPMS frame according to various embodiments of the present invention.

Referring now to FIG. 13, one example of an RKE frame being received immediately followed by a TPMS frame is described. An RKE message 1302 is received (e.g., 18 bytes of data) on ADATA. A TPMS data message 1304 is received on ADATA. The messages are output on RF data, but the length is changed for each message. In one aspect, the preamble is reduced since the vehicular controller does not require the entire preamble.

Figure 14:
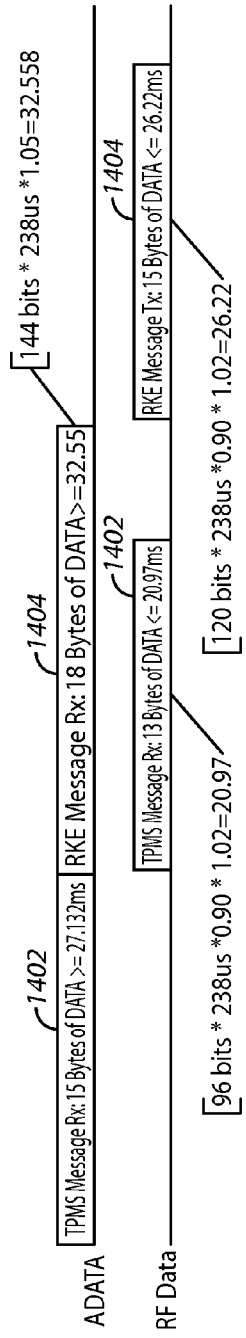
FIG. 14 comprises a timing diagram of one example of a TPMS frame immediately followed by an RKE frame according to various embodiments of the present invention.

Referring now to FIG. 14, one example of a TPMS frame being received immediately followed by an RKE frame is described. A TPMS data message 1402 is received on ADATA (e.g., 15 bytes of data). An RKE message 1404 is received (e.g., 18 bytes of data) on ADATA. The messages are output on RF data, but the length is changed for each message. In one aspect, the preamble is reduced since the vehicular controller does not require the entire preamble.

Figure 15:
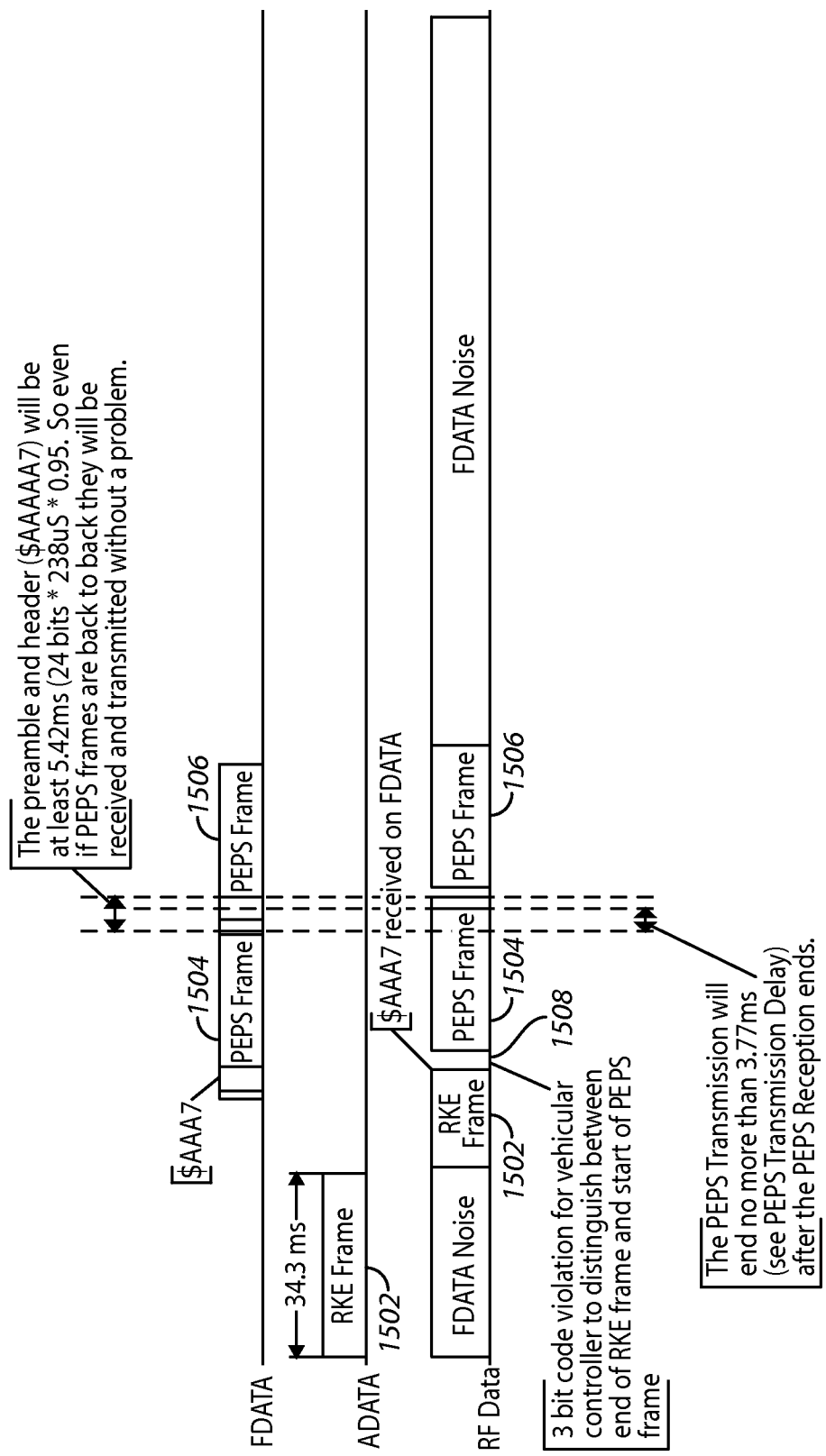
FIG. 15 comprises a timing diagram of one example of back-to-back PEPS frames being received while outputting an RKE frame according to various embodiments of the present invention.

Referring now to FIG. 15, one example of back-to-back PEPS frames being received while outputting an RKE frame is described. An RKE frame 1502 is received. The RKE frame 1502 is output. While outputting the RKE frame 1502, a first PEPS frame 1504 is received followed by a second PEPS frame 1506. The first PEPS frame 1504 has a preamble and header $AAA7. In this example, the preamble and header will be at least 5.42 ms (24 bits *238us*.095). Even if the PEPS frames 1504 and 1506 are back to back, they will be received and transmitted without a problem. The PEPS frame s 1504 and 1506 will be transmitted on RF data. A 3-bit code violation 1508 is inserted for the vehicular controller to distinguish between the end of the RKE frame and the PEPS frame. In addition, the PEPS transmission will end no more than 3.77 ms after the PEPS reception ends.

Figure 16:
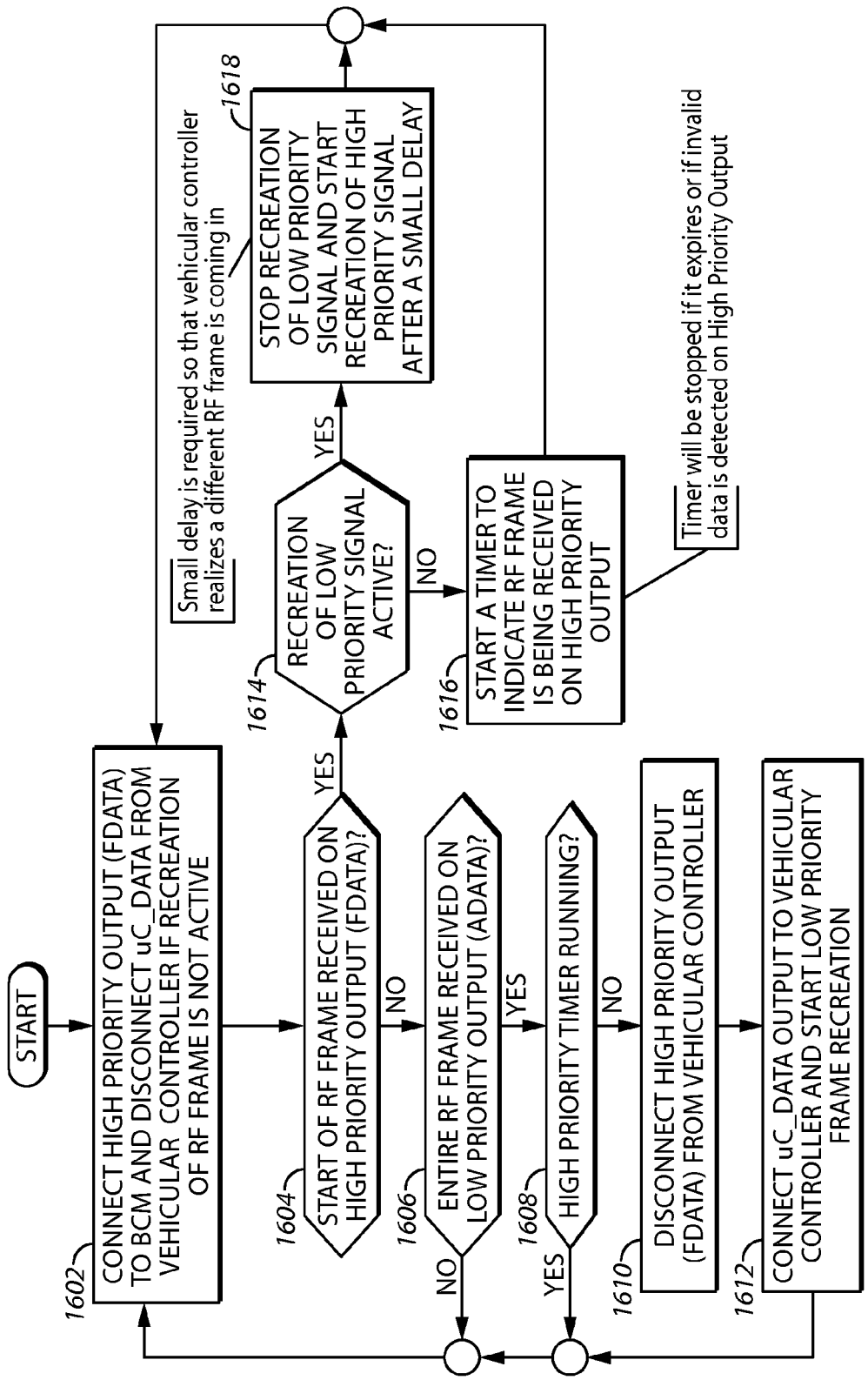
FIG. 16 comprises a flowchart showing the operation of a receiver module according to various embodiments of the present invention.

Referring now to FIG. 16, one example of the operation of a receiver module (e.g., module 200) is described. In this example, a receiver chip in the module receives ASK and FSK data and output them on data lines ADATA and FDATA. A controller within the module couples to FDATA and ADATA and is configured to select as between FDATA or ADATA for output on a data line RF data and RF data is connected to an external vehicular controller. The controller within the module also recreates data ("microcontroller data") as needed.

At step 1602, the high priority output (FDATA) of the module is connected to the external vehicular controller and the microcontroller data is disconnected from being output to the vehicular controller if the recreation of an RF frame is not active. At step 1604, it is determined if the start of a RF frame is received on the high priority output (FDATA). If the answer is affirmative, execution continues at step 1614. If the answer is negative, execution continues at step 1606.

At step 1606, it is determined if the entire RF frame received on the low priority output ADATA. If the answer is negative, execution continues at step 1602 as described above. If the answer is affirmative, then execution continues at step 1608.

At step 1608, it is determined if the high priority timer is running If the answer is negative, execution continues at step 1602 as described above. If the answer is affirmative, then execution continues at step 1610. The purpose of the high priority timer is to ensure that a low priority frame (e.g., a RKE frame) isn't recreated while a PEPS frame is being received.

At step 1610, the high priority output to the vehicular controller is disconnected. At step 1612, a connection is made between the vehicular controller and the module, low priority frame recreation is initiated, and the recreated frames are output to the vehicular controller. Control then continues at step 1602.

At step 1614, it is determined if the recreation of a low priority signal is active. If the answer is affirmative, control continues at step 1618. If the answer is negative, execution continues at step 1616.

At step 1616, a timer is started to indicate that the RF frame is being received at the high priority data line. The timer will be stopped if it expires or if invalid data is detected on the high priority data line. Execution continues at step 1602. Invalid data may be detected by receiving data that is not properly encoded (e.g., Manchester encoded) or is not at the correct data rate (e.g., 4.2 kbps).

At step 1618, recreation of the low priority signal is halted and the high priority signal is recreated after a small delay. The small delay is utilized so that the vehicular controller realizes a different frame is being received. Execution continues at step 1602.

Referring now to FIG. 17, one example of a control unit (e.g., control unit 104 or control unit 204) is described. The apparatus is configured to receiving signals of multiple types and comprises an interface 1702 and a controller 1704. The interface 1702 has an input 1706 and an output 1708. The output 1708 may include a high priority activation line 1710 (that activates circuitry to allow high priority data to be output to an external vehicular controller) and a low priority activation line 1712 (that activates circuitry to allow low priority data to be output to the external vehicular controller).

The interface 1702 is configured to receive a first signal at the input 1706. The first signal is of an ASK-compliant modulation type. The interface 1702 is further configured to receive a second signal at the input 1706. The second signal is of a FSK-compliant modulation type.

The controller 1704 is coupled to the interface 1702. The controller 1704 is configured to, based upon a set of predetermined criteria, select one of the first signal and the second signal. The predetermined criteria at least in part indicating a priority as between ASK-compliant and FSK-compliant communications and to transmit the selected signal to a vehicular controller. In this respect, the lines 1710 and 1720 may control switches (e.g., transistors) that route high or low priority data to the external vehicular controller.

The controller 1704 may be any type of processing device such as a microprocessor or the like. A separate memory may be associated and coupled to this microprocessor (or incorporated into the microprocessor itself. The memory may be any type of computer readable memory such as a ROM, RAM, EEPROM, or combinations of these or other memory types. Other examples of memory types and processing devices are possible. The approaches described herein can be implemented as software instructions executed at the microprocessor.

It will be understood that any of the functions and approaches described herein may be implemented by computer instructions stored on a computer media (e.g., in a memory) and executed by a processing device (e.g., a microprocessor, controller, or the like). To take one example, the timers described herein can be implemented wholly or partially in software and executed from a general purpose computer. To take still another example, various buffers may be used to store the frames that are being recreated and the buffers may be implemented as memory locations in, for example, the processing devices described herein.

It will also be understood that the software instructions described herein can be implemented in any coding language or scheme. In this regard, it will be appreciated that a variety of different data structures (e.g., arrays, linked lists, pointers, and so forth) may be utilized to implement the various software instructions and that these elements themselves may be stored in any of the memories described herein.

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of receiving signals of multiple types, the method comprising:
   at a vehicle:
   receiving a first signal, the first signal being of an ASK-compliant modulation type;
   receiving a second signal, the second signal being of a FSK-compliant modulation type;
   based upon a set of predetermined criteria, selecting one of the first signal and the second signal, the predetermined criteria at least in part indicating a priority as between ASK-compliant and FSK compliant communications;
   transmitting the selected signal data to a vehicular controller over a single transmission line;
   wherein the predetermined criteria comprise at least one of:
   whether a received low priority frame is an actual low priority frame rather than a reflection;
   whether the actual low priority frame is being recreated; and whether a valid high priority frame is being received;
   selectively storing one of the high priority frame and the low priority frame in a buffer, wherein selectively storing comprises choosing between at least two of completely storing, partially storing, and not storing;
   recreating a frame, at least partially, at a faster data rate than the data rate at which the frame was received.

2. The method of claim 1 wherein the selecting comprises determining whether the first signal or the second signal is a reflected signal and ignoring the reflected signal.

3. The method of claim 1 wherein the first signal is selected from the group comprising a remote keyless entry (RKE) frame and a tire pressure monitoring system (TPMS) frame.

4. The method of claim 1 wherein the second signal comprises a PEPS frame.

5. The method of claim 1 further comprising recreating low priority frames for transmission to the vehicular controller.

6. The method of claim 1 further comprising recreating high priority frames for transmission to the vehicular controller.

7. An apparatus configured to receiving signals of multiple types, the apparatus comprising:
   an interface having an input and an output, the interface configured to receive a first signal at the input, the first signal being of a ASK-compliant modulation type and further configured to receive a second signal at the input, the second signal being of a FSK-compliant modulation type; and
   a controller comprising a microcontroller, the controller coupled to the interface, the controller configured to, based upon a set of predetermined criteria, select one of the first signal and the second signal, the predetermined criteria at least in part indicating a priority as between ASK-compliant and FSK compliant communications and to issue a control signal at the output that is effective to transmit the selected signal data to an external vehicular controller over a single transmission line;
   wherein the predetermined criteria comprise at least one of
   whether a received low priority frame is an actual low priority frame rather than a reflection;
   whether the actual low priority frame is being recreated; and whether a valid high priority frame is being received; the controller further configured to selectively store one of the high priority frame and the low priority frame in a buffer, wherein selectively storing comprises choosing between at least two of completely storing, partially storing, and not storing;
   recreating a frame, at least partially, at a faster data rate than the data rate at which the frame was received.

8. The method of claim 7 wherein the controller is further configured to determine whether the first signal or the second signal is a reflected signal and to ignore the reflected signal.

9. The method of claim 7 wherein the first signal is selected from the group comprising a remote keyless entry (RKE) frame and a tire pressure monitoring system (TPMS) frame.

10. The method of claim 7 wherein the second signal comprises a PEPS frame.

11. The apparatus of claim 7 wherein the controller is further configured to recreate low priority frames for transmission to the vehicular controller.

12. The apparatus of claim 7 wherein the controller is further configured to recreate high priority frames for transmission to the vehicular controller.

13. A computer usable non-transitory medium having a computer readable program code embodied therein, said computer readable program code adapted to be executed to implement a method of receiving signals of multiple types, the method comprising:
    at a vehicle:
        receiving a first signal, the first signal being of an ASK-compliant modulation type;
        receiving a second signal, the second signal being of a FSK-compliant modulation type;
        based upon a set of predetermined criteria, selecting one of the first signal and the second signal, the predetermined criteria at least in part indicating a priority as between ASK-compliant and FSK compliant communications;
        transmitting the selected signal data to a vehicular controller over a single transmission line;
        wherein the predetermined criteria comprise at least one of:
        whether a received low priority frame is an actual low priority frame rather than a reflection;
        whether the actual low priority frame is being recreated; and whether a valid high priority frame is being received;
        selectively storing one of the high priority frame and the low priority frame in a buffer, wherein selectively storing comprises choosing between at least two of completely storing, partially storing, and not storing;
        recreating a frame, at least partially, at a faster data rate than the data rate at which the frame was received.

14. The computer usable non-transitory medium of claim 13 wherein the method further comprises determining whether the first signal or the second signal is a reflected signal and ignoring the reflected signal.

15. The computer usable non-transitory medium of claim 13 wherein the first signal is selected from the group comprising a remote keyless entry (RKE) frame and a tire pressure monitoring system (TPMS) frame.

16. The computer usable non-transitory medium of claim 13 wherein the second signal comprises a PEPS frame.

17. The computer usable non-transitory medium of claim 13 wherein the method further comprises recreating low priority frames for transmission to the vehicular controller.

18. The computer usable non-transitory medium of claim 13 wherein the method further comprises recreating high priority frames for transmission to the vehicular controller.

19. The apparatus of claim 7 wherein the controller further comprises a computer usable non-transitory medium having a computer readable program code embodied therein, said computer readable program code adapted to be executed by the microcontroller to at least partially select one of the first signal and the second signal based upon the set of predetermined criteria.

20. The apparatus of claim 7 wherein the controller further comprises a computer usable non-transitory medium having a computer readable program code embodied therein, said computer readable program code adapted to be executed by the microcontroller to at least partially recreate frames for transmission to the vehicular controller.

21. The method of claim 1 further comprising recreating a frame while the frame is being selectively stored.

22. The apparatus of claim 7 wherein the controller is further configured to recreate a frame while the frame is being selectively stored.

23. The computer usable non-transitory medium of claim 13 wherein the method further comprises recreating a frame while the frame is being selectively stored.

* * * * *